US006934830B2

(12) United States Patent
Kadambi et al.

(10) Patent No.: US 6,934,830 B2
(45) Date of Patent: Aug. 23, 2005

(54) METHOD AND APPARATUS FOR REDUCING REGISTER FILE ACCESS TIMES IN PIPELINED PROCESSORS

(75) Inventors: Sudarshan Kadambi, Hayward, CA (US); Adam R. Talcott, San Jose, CA (US); Wayne I. Yamamoto, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 419 days.

(21) Appl. No.: 10/259,721

(22) Filed: Sep. 26, 2002

(65) Prior Publication Data
US 2004/0064680 A1 Apr. 1, 2004

(51) Int. Cl.$^7$ .................................................. G06F 9/30
(52) U.S. Cl. ........................ 712/214; 711/125; 712/219
(58) Field of Search .............................. 711/126, 125; 712/214, 219

(56) References Cited

U.S. PATENT DOCUMENTS

| 5,117,493 A | * | 5/1992 | Jensen ........................ 711/140 |
| 5,638,526 A | * | 6/1997 | Nakada ....................... 712/218 |
| 5,956,747 A | * | 9/1999 | Wilhelm et al. ............. 711/140 |
| 5,987,594 A | * | 11/1999 | Panwar et al. .............. 712/216 |
| 6,148,371 A | * | 11/2000 | Hetherington et al. ...... 711/122 |
| 6,289,417 B1 | * | 9/2001 | Larri ........................... 711/131 |

FOREIGN PATENT DOCUMENTS

EP   0 717 359 A2   6/1996

OTHER PUBLICATIONS

Publication entitled "Two–Level Hierarchical Register File Organization for VLIW Processors", by Javier Zalamea et al., IEEE, 2000, pp. 137–146.
Publication entitled "Multiple–Banked Register File Architectures", by Jose–Lorenza Cruz et al., XP–001003052, ACM, 2000, pp. 316–325.

* cited by examiner

*Primary Examiner*—Kenneth S. Kim
(74) *Attorney, Agent, or Firm*—Park, Vaughan & Fleming LLP; Edward J Grundler

(57) ABSTRACT

One embodiment of the present invention provides a system that reduces the time required to access registers from a register file within a processor. During operation, the system receives an instruction to be executed, wherein the instruction identifies at least one operand to be accessed from the register file. Next, the system looks up the operands in a register pane, wherein the register pane is smaller and faster than the register file and contains copies of a subset of registers from the register file. If the lookup is successful, the system retrieves the operands from the register pane to execute the instruction. Otherwise, if the lookup is not successful, the system retrieves the operands from the register file, and stores the operands into the register pane. This triggers the system to reissue the instruction to be executed again, so that the re-issued instruction retrieves the operands from the register pane.

15 Claims, 3 Drawing Sheets

US 6,934,830 B2

METHOD AND APPARATUS FOR REDUCING REGISTER FILE ACCESS TIMES IN PIPELINED PROCESSORS

BACKGROUND

1. Field of the Invention

The present invention relates to the design of processors within computer systems. More specifically, the present invention relates to a method and apparatus for reducing the time required to access a register file during execution of an instruction within a pipelined processor.

2. Related Art

As processor clock speeds continue to increase at an exponential rate, it is becoming progressively harder to ensure that the circuitry within the processors keeps pace with the increasing clock speeds. A processor typically uses a fast register file to store operands for instructions. This allows the processor to the read operands for computational operations from the register file, instead of taking the additional time to retrieve the operands from cache or memory.

Because of the way programs are designed, each function within a program typically operates on its own set of registers. Hence, the processor's "active register set" changes each time the current function changes, for example during a function call operation or a function return operation. This change can involve saving the current register set to memory during a function call operation to make room for a register set for the new function, and subsequently restoring the current register set from memory during a corresponding function return operation. Unfortunately, this process of saving and restoring register sets to memory is extremely time-consuming and can significantly degrade computer system performance.

In order to deal with this problem, modern computer architectures typically make use of a large set of registers to reduce the time required to perform save and restore operations. This large set of registers is typically divided into a number of "register windows," wherein each register window contains the register set for a different function on the call stack. This makes it possible to simply switch between register windows during a function call operation, instead of having to save and restore registers to memory.

Unfortunately, as register files increase in size and as clock speeds continue to increase, additional clock cycles are needed to access the large register files. These additional clock cycles increase the pipeline depth of the processor, and can thereby adversely affect processor performance.

What is needed is a method and an apparatus for accessing registers within a large register file without requiring additional processor cycles.

SUMMARY

One embodiment of the present invention provides a system that reduces the time required to access registers from a register file within a processor. During operation, the system receives an instruction to be executed, wherein the instruction identifies at least one operand to be accessed from the register file. Next, the system looks up the operands in a register pane, wherein the register pane is smaller and faster than the register file and contains copies of a subset of registers from the register file. If the lookup is successful, the system retrieves the operands from the register pane to execute the instruction. Otherwise, if the lookup is not successful, the system retrieves the operands from the register file, and stores the operands into the register pane. This triggers the system to reissue the instruction to be executed again, so that the re-issued instruction retrieves the operands from the register pane.

In a further variation, reissuing the instruction to be executed again involves automatically reissuing the instruction unless a confirmation is received that the operands were successfully retrieved from the register pane.

In yet a further variation, reissuing the instruction to be executed again involves returning the instruction to a dispatch window to be dispatched again.

In a variation on this embodiment, storing the operands in the register pane involves overwriting least recently used or invalid registers in the register pane so that the most recently used registers remain in the register pane.

In a variation on this embodiment, looking up the operands in the register pane involves comparing register identifiers for the operands against register identifiers associated with registers stored in the register pane.

In a variation on this embodiment, the system executes a subsequent instruction while the operands for the instruction are being retrieved from the register file.

In a variation on this embodiment, the system additionally writes back results of the instruction to both the register pane and the register file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
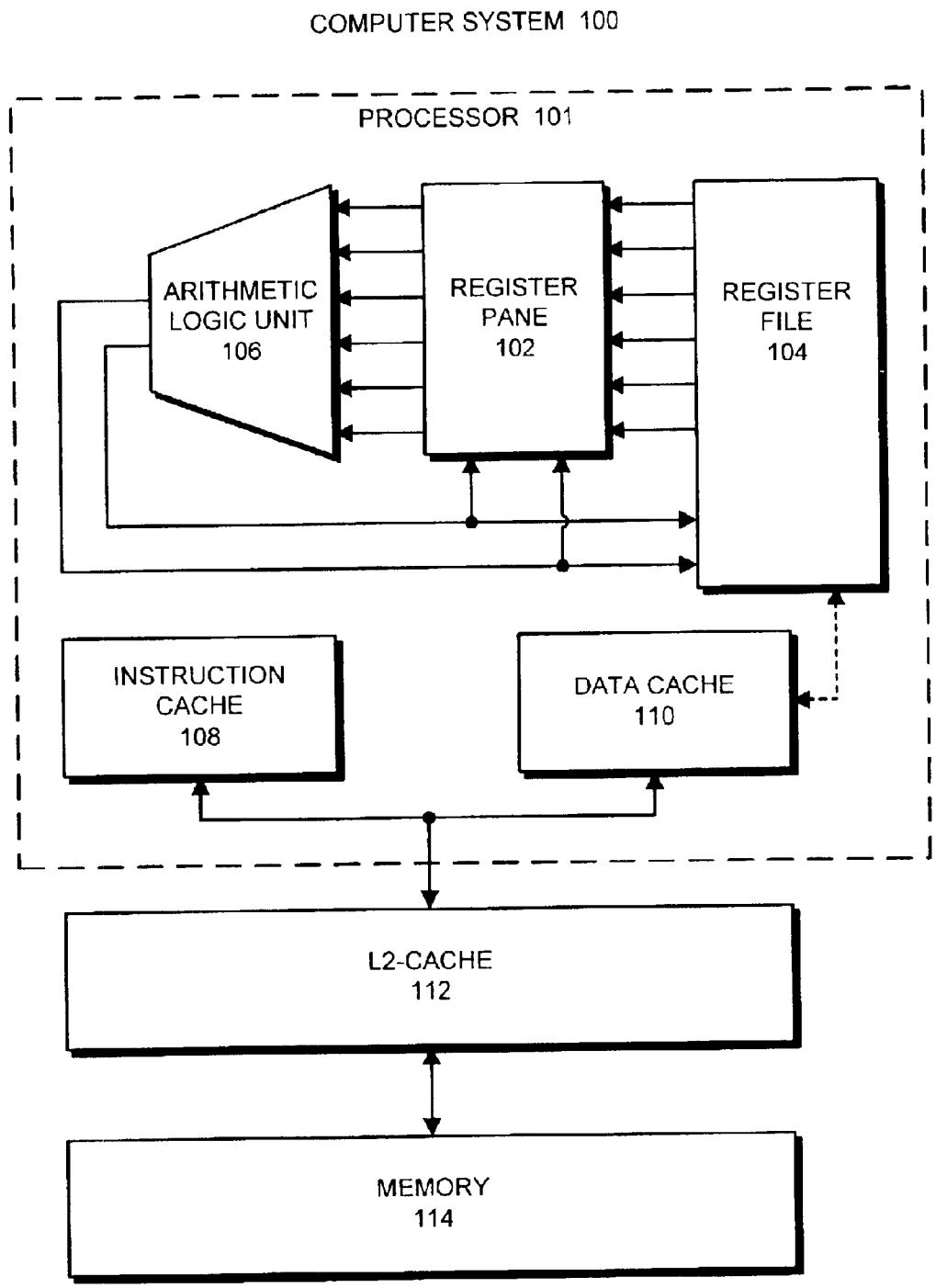
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. Computer system 100 includes a processor 101, an L2 cache 112 and a memory 114. Memory 114 can include any type of random access memory for storing code and data to be executed by processor 101. L2 cache 112 can include any type of cache that is able to store instructions and data that have been recently referenced by processor 101.

FIG. 1 also illustrates a number of structures within processor 101, including arithmetic logic unit (ALU) 106, register pane 102, register file 104, instruction cache 108 and data cache 110. Instruction cache 108 contains recently referenced instructions retrieved from L2 cache 112. Data cache 110 contains recently referenced data from L2 cache 112.

During program execution, operands retrieved from data cache 110 are stored within register file 104. Register file 104 can include any type of general-purpose register file. Moreover, register file 104 can store architecturally visible registers, as well as registers that are not architecturally visible, such as registers associated with in-flight instructions and temporary registers.

In order to execute a program instruction, operands for the instruction are copied from register file 104 to register pane 102, if necessary. Next, the operands are transferred from register pane 102 through ALU 106. ALU 106 can include any type of arithmetic logic unit within a processor that can perform computational operations between operands. After ALU 106 performs the arithmetic operation, the result of the operation is written back into both register pane 102 and register file 104.

Because register pane 102 is significantly smaller than register file 104, the time required to access register pane 102 can be significantly less than the time required to access register file 104. (For example, register pane 102 may contain 32 registers while register file 104 contains 256 registers.) This allows instructions that access registers within register pane 102 to execute faster, with fewer pipeline stages.

If a register to be accessed is not present in register pane 102, a copy of the register is retrieved from register file 104 and is stored into register pane 102 as is described below with reference to FIG. 3.

Instruction Execution

Figure 2:
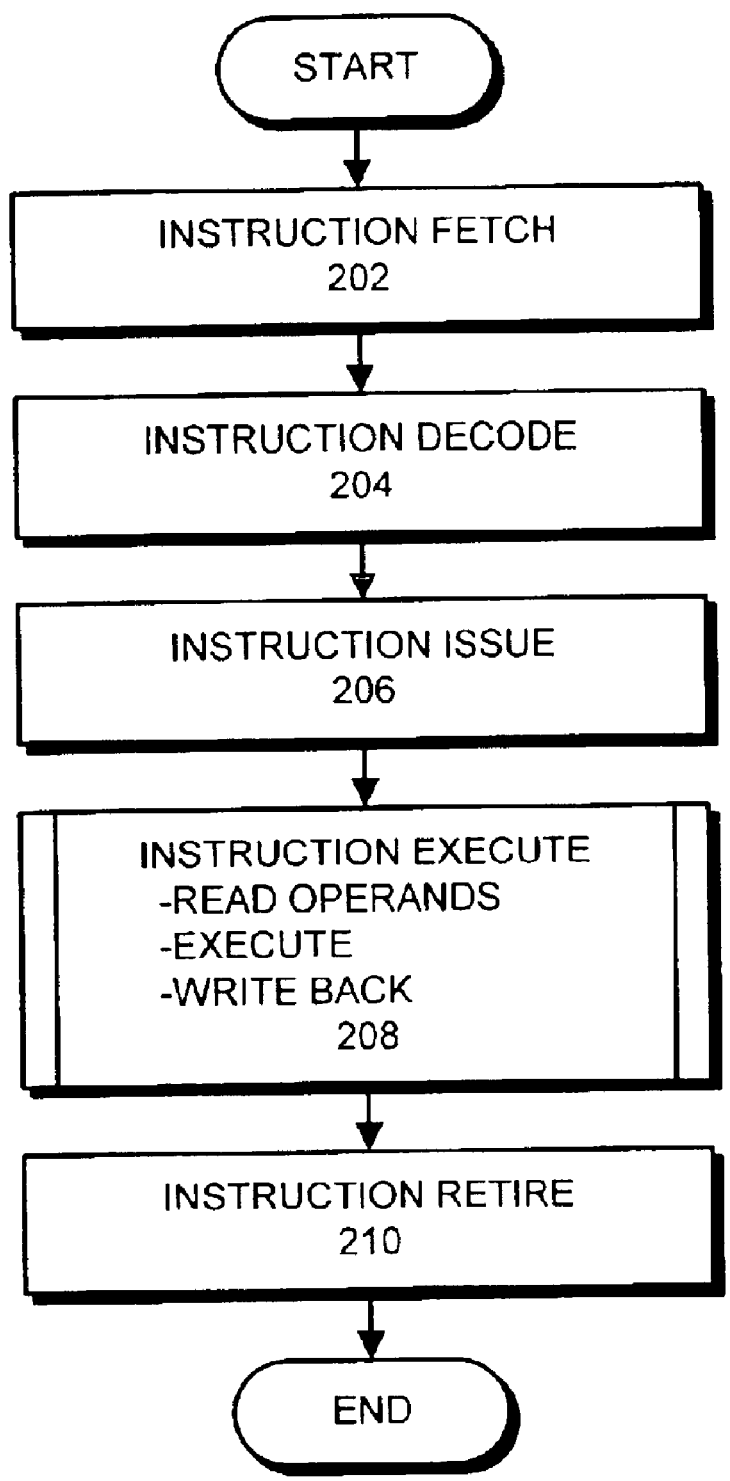
FIG. 2 presents a flow chart illustrating instruction execution in accordance with an embodiment of the present invention.

FIG. 2 presents a flow chart illustrating the operations involved in instruction execution in accordance with an embodiment of the present invention. During execution of an instruction, processor 101 first performs an instruction fetch operation (step 202) to retrieve the instruction from instruction cache 108. Next, processor 101 performs an instruction decode operation to identify the type of instruction and the operands (step 204). At this point, the instruction is typically stored in an instruction scheduling window (also known as a "reorder buffer" or a "dispatch window") waiting to be issued.

When all of the dependencies for the instruction have been satisfied, processor 101 issues the instruction (step 206). This causes an instruction execution to take place (step 208). During the instruction execution, processor 101 reads the operands for the instruction, executes the instruction, and then writes the result back to the registers. Finally, when the instruction is complete, it is retired (step 210). At this point, processor 101 returns to fetch a subsequent instruction. Although note that since processor 101 is pipelined, subsequent instructions can be initiated before a current instruction completes.

Accessing the Register Pane

Figure 3:
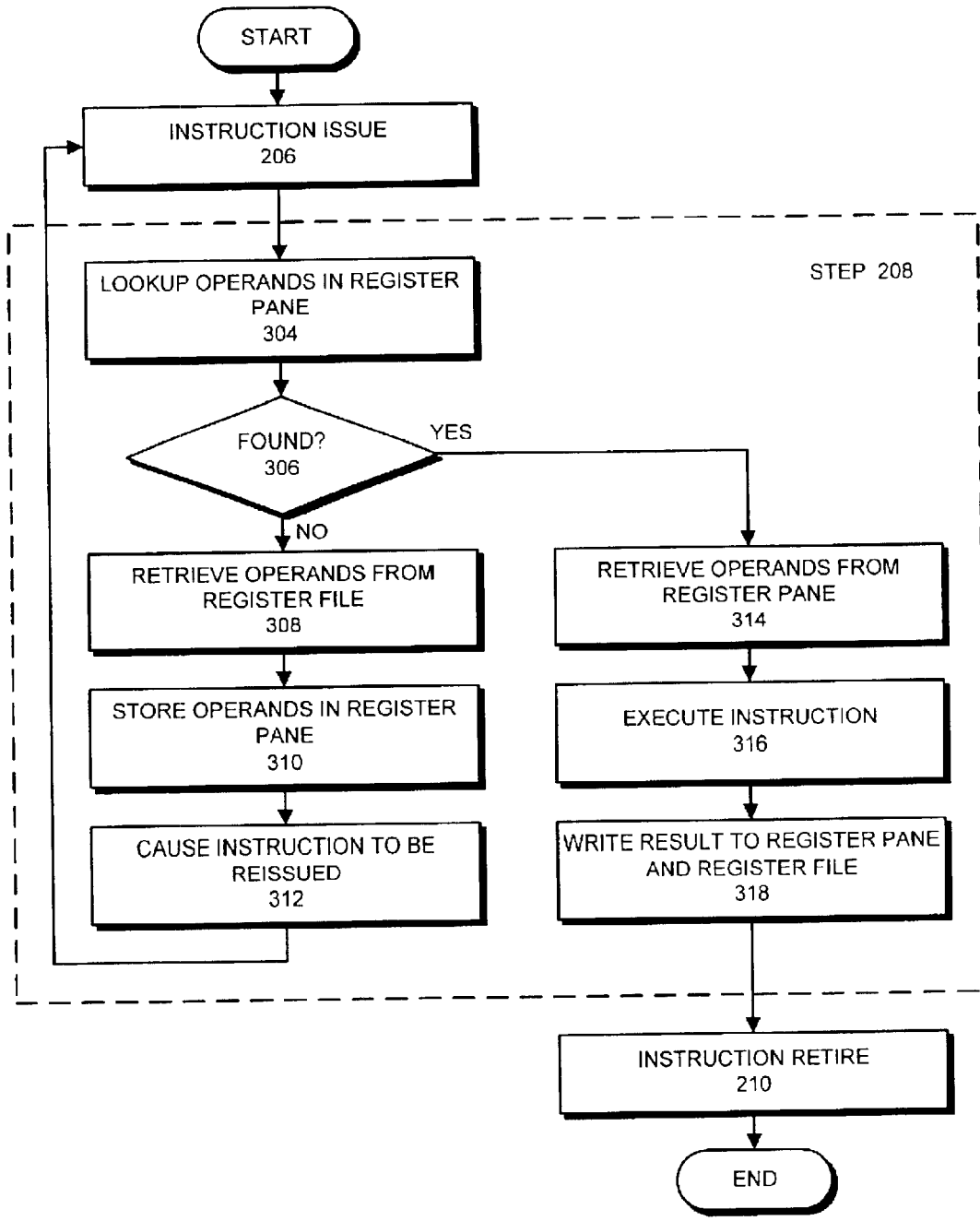
FIG. 3 presents a flow chart illustrating operations that access the register pane during instruction execution in accordance with an embodiment of the present invention.

FIG. 3 presents a flow chart illustrating operations that access register pane 102 during instruction execution in accordance with an embodiment of the present invention. This flow chart illustrates in more detail the operations that take place in steps 206, 208 and 210 of the flow chart illustrated in FIG. 2.

These operations start after the instruction is issued for execution (step 206). At this point, processor 101 looks up the operands for the instruction in register pane 102 to determine if they are present in register pane 102 (step 304). This can involve comparing register identifiers for the set of operands against register identifiers associated with registers stored in register pane 102.

Note that like that like a cache, register pane 102 can either be direct-mapped, set-associative or fully associative. If register pane 102 is direct-mapped, a given subset of registers from register file 104 is mapped to a given register in register pane 102. If register pane 102 is set-associative, a given subset of registers from register file 104 can be mapped into a smaller subset of registers in register pane 102. If register pane 102 is fully associative, any entry in register file 104 can be mapped to any entry in the register pane 102.

Note that the direct-mapped scheme requires only a single comparator, however it has the worst hit rate of the three options. A set-associative scheme limits the number of comparators to the associativity of the register panes, and hence, requires slightly more hardware than a direct-mapped scheme, but it also has a higher hit rate. A fully associative scheme has a comparator for each entry in register pane 102. This requires the most hardware, but achieves the highest hit rate. The optimal choice between these three schemes depends on a number of factors, such as feature size, die size and targeted performance.

If the operands are found in register pane 102, processor 101 retrieves the operands from register pane 102 (step 314). Processor 101 then executes the instruction by passing the operands through ALU 106 (step 316). Next, processor 101 writes the result of the instruction to a destination register in both register pane 102 and register file 104 (step 318). Recall that register pane 102 contains a copy of the destination register from register file 104. Hence, in order to keep this copy consistent, the copy of the destination register in register pane 102 is written to at the same time the destination register is written to in register file 104. At this point the instruction is complete, and can be retired (step 210).

If one or more of the operands for the instruction are not found within register pane 102, the missing operands are retrieved from register file 104 (step 308) and are stored into register pane 102 (step 310).

Note that a number of different schemes can be used to determine which operands to overwrite. In one embodiment of the present invention, the new operands are written over the least recently used (LRU) operands within register pane 102. This causes the most recently referenced operands to remain within register pane 102. In another embodiment, random operands are overwritten. In yet another embodiment, a round-robin scheme is used to determine which operands to overwrite. Note that this round-robin scheme has the advantage of being very fast.

Next, processor 101 causes the instruction to be reissued so that the operands can be retrieved from register pane 102 (step 312). This can be done in a number of ways. In one embodiment of the present invention, the instruction could be automatically reissued a few clock cycles later unless a confirmation is received that operands were successfully retrieved from the register pane. In another embodiment, the processor could wait until operands are retrieved from the register file and stored in the register pane before dispatching the instruction. Note that the instruction will be dispatched almost immediately if the processor uses an "oldest-instruction-first" dispatch policy.

Also note that while the current instruction is being reissued, subsequent instructions in the pipeline can be executed in an out-of-order processor. This allows the processor to perform subsequent instructions while operands for the current instruction are being copied into register pane 102.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing the time required to access registers from a register file within a processor, comprising:
   receiving an instruction to be executed, wherein the instruction identifies a set of operands to be accessed from the register file, wherein the set of operands includes at least one operand;
   looking up the set of operands in a register pane, wherein the register pane is smaller and faster than the register file and contains copies of a subset of registers from the register file; and
   if the lookup is successful, retrieving the set of operands from the register pane to execute the instruction;
   if the lookup is not successful,
      retrieving the set of operands from the register file,
      storing the set of operands into the register pane, and
      reissuing the instruction to be executed again, so that the re-issued instruction retrieves the set of operands from the register pane,
      wherein reissuing the instruction to be executed again involves automatically reissuing the instruction unless a confirmation is received that that set of operands was successfully retrieved from the register pane; and
   writing back results of the instruction to both the register pane and the register file.

2. The method of claim 1, wherein reissuing the instruction to be executed again involves returning the instruction to a dispatch window to be dispatched again.

3. The method of claim 1, wherein storing the set of operands in the register pane involves overwriting least recently used or invalid registers in the register pane so that the most recently used registers remain in the register pane.

4. The method of claim 1, wherein looking up the set of operands in the register pane involves comparing register identifiers for the set of operands against register identifiers associated with registers stored in the register pane.

5. The method of claim 1, further comprising executing a subsequent instruction while the set of operands for the instruction is being retrieved from the register file.

6. An apparatus that reduces the time required to access registers from a register file within a processor, comprising:
   the processor;
   the register file within the processor;
   a register pane within the processor, wherein the register pane is smaller and faster than the register file and contains copies of a subset of registers from the register file;
   an execution unit within the processor configured to receive an instruction to be executed, wherein the instruction identifies a set of operands to be accessed from the register file, wherein the set of operands includes at least one operand;
   a lookup mechanism configured to look up the set of operands in the register pane;
   wherein if the lookup is successful, the processor is configured to retrieve the set of operands from the register pane to execute the instruction;
   wherein if the lookup is not successful, the processor is configured to,
      retrieve the set of operands from the register file,
      store the set of operands into the register pane, and to
      reissue the instruction to be executed again, so that the re-issued instruction retrieves the set of operands from the register pane,
      wherein the reissue mechanism is configured to automatically reissue the instruction unless a confirmation is received that that set of operands was successfully retrieved from the register pane; and
   a writeback mechanism within the processor configured to write back results of the instruction to both the register pane and the register file.

7. The apparatus of claim 6, wherein the reissue mechanism is configured to return the instruction to a dispatch window to be dispatched again.

8. The apparatus of claim 6, wherein while storing the set of operands in the register pane, the processor is configured to overwrite least recently used or invalid registers in the register pane so that the most recently used registers remain in the register pane.

9. The apparatus of claim 6, wherein the lookup mechanism is configured to compare register identifiers for the set of operands against register identifiers associated with registers stored in the register pane.

10. The apparatus of claim 6, wherein the execution unit is configured to execute a subsequent instruction while the set of operands for the instruction is being retrieved from the register file.

11. An computer system that reduces the time required to access registers from a register file within a processor, comprising:
   the processor;
   a memory;
   a non-volatile storage device;
   a display;
   the register file within the processor;
   a register pane within the processor, wherein the register pane is smaller and faster than the register file and contains copies of a subset of registers from the register file;
   an execution unit within the processor configured to receive an instruction to be executed, wherein the instruction identifies a set of operands to be accessed from the register file, wherein the set of operands includes at least one operand;
   a lookup mechanism configured to look up the set of operands in the register pane;
   wherein if the lookup is successful, the processor is configured to retrieve the set of operands from the register pane to execute the instruction; and
   wherein if the lookup is not successful, the processor is configured to,
      retrieve the set of operands from the register file,
      store the set of operands into the register pane, and to
      reissue the instruction to be executed again, so that the re-issued instruction retrieves the set of operands from the register pane,
      wherein the reissue mechanism is configured to automatically reissue the instruction unless a confirmation is received that that set of operands was successfully retrieved from the register pane; and
   a writeback mechanism within the processor configured to write back results of the instruction to both the register pane and the register file.

12. The computer system of claim 11, wherein the reissue mechanism is configured to return the instruction to a dispatch window to be dispatched again.

13. The computer system of claim 11, wherein while storing the set of operands in the register pane, the processor is configured to overwrite least recently used or invalid registers in the register pane so that the most recently used registers remain in the register pane.

14. The computer system of claim 11, wherein the lookup mechanism is configured to compare register identifiers for the set of operands against register identifiers associated with registers stored in the register pane.

15. The computer system of claim 11, wherein the execution unit is configured to execute a subsequent instruction while the set of operands for the instruction is being retrieved from the register file.

* * * * *